(12) United States Patent
Vrsalovic et al.

(10) Patent No.: US 7,217,001 B2
(45) Date of Patent: May 15, 2007

(54) LED NAIL CLIPPER

(76) Inventors: Tatiana Vrsalovic, 3330 Ketch Ave., Oxnard, CA (US) 93035; Alex Gonzales, 5165 Wooley Rd., Oxnard, CA (US) 93035

( * ) Notice: Subject to any disclaimer, the term of this patent is extended or adjusted under 35 U.S.C. 154(b) by 68 days.

(21) Appl. No.: 11/141,404

(22) Filed: May 31, 2005

(65) Prior Publication Data

US 2006/0268540 A1 Nov. 30, 2006

(51) Int. Cl.
*B25B 21/46* (2006.01)

(52) U.S. Cl. .................. 362/119; 362/253; 362/800; 7/162; 132/73.5

(58) Field of Classification Search ........ 362/119–120, 362/253, 800; 7/162; 132/73.5; 30/28, 30/123
See application file for complete search history.

(56) References Cited

U.S. PATENT DOCUMENTS

| 5,533,262 | A | 7/1996 | Clark | 30/30 |
| 5,918,375 | A | 7/1999 | Rossi, III | 33/33 |
| 6,553,592 | B2 | 4/2003 | Yang et al. | 7/30 |
| 2004/0123875 | A1* | 7/2004 | Kim | 132/73.5 |
| 2005/0211030 | A1* | 9/2005 | Moulton | 83/13 |
| 2006/0180169 | A1* | 8/2006 | Lund et al. | 132/73.5 |

* cited by examiner

*Primary Examiner*—Ali Alavi
(74) *Attorney, Agent, or Firm*—Philip T. Virga

(57) ABSTRACT

A lighting device for use in combination with a nail clipper and cutting pliers is disclosed. The lighting device comprises a casing defining an angular front wall having an electric power source, a switch and a light-emitting element all integrally assembled and electrically connected within the casing. A radiation surface is mounted within the angular front wall for transmitting illumination light emitted from the light-emitting element wherein means for removably attaching the casing to either the nail clipper or cutting pliers are provided whereby the angle defined by the front wall positions the illumination light emitted from the light-emitting element for illuminating a blood vein or nerve through the animals nail such that the user does not strike or nick the blood vein or nerve during a cutting operation.

20 Claims, 3 Drawing Sheets

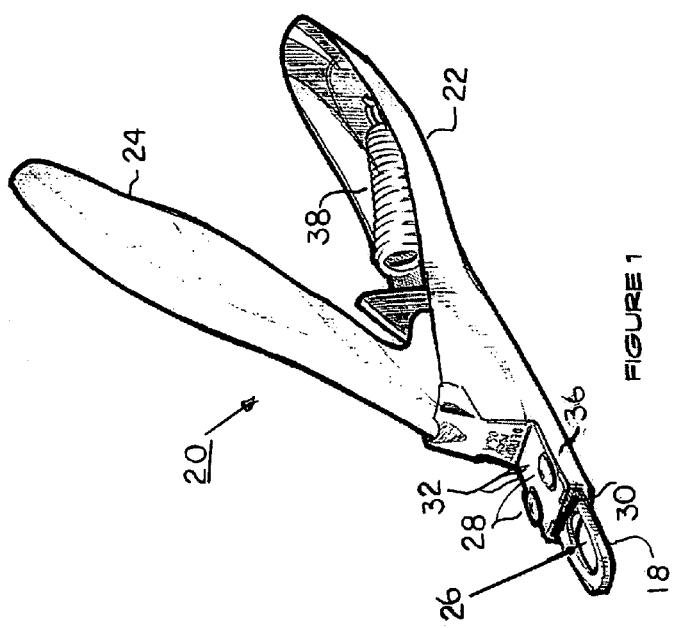
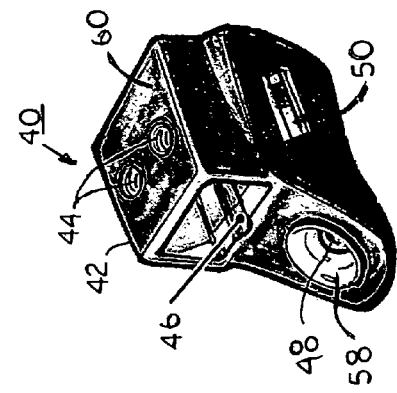
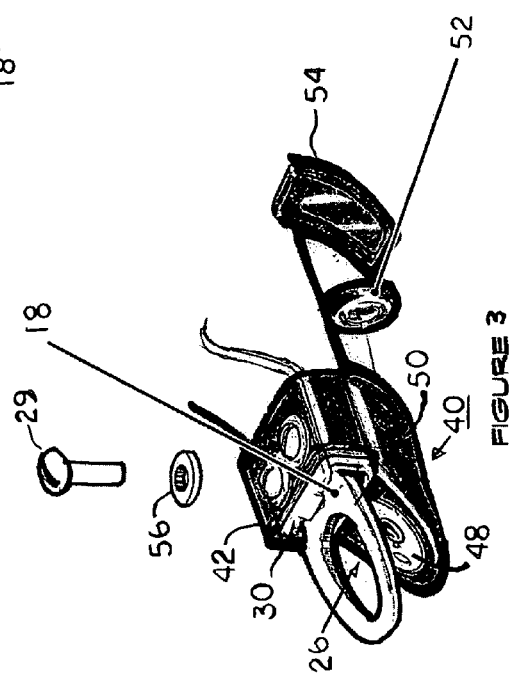

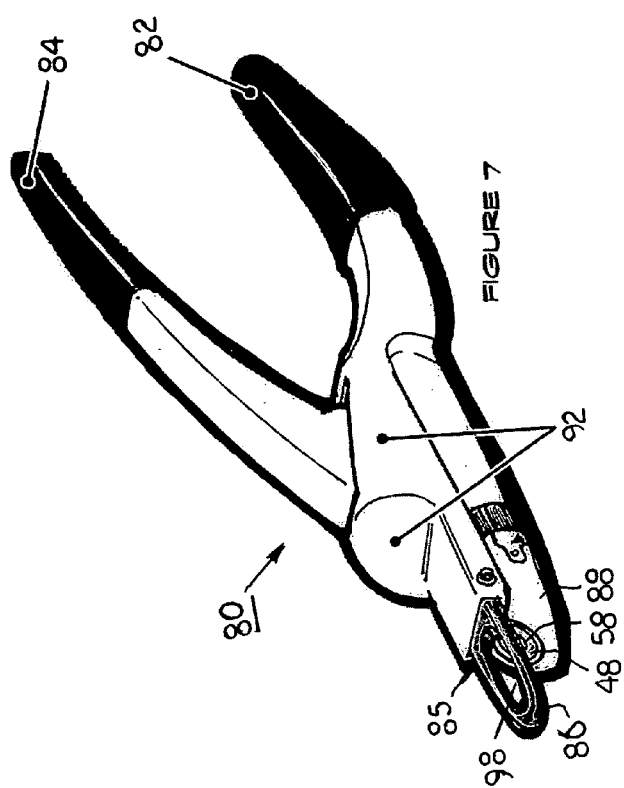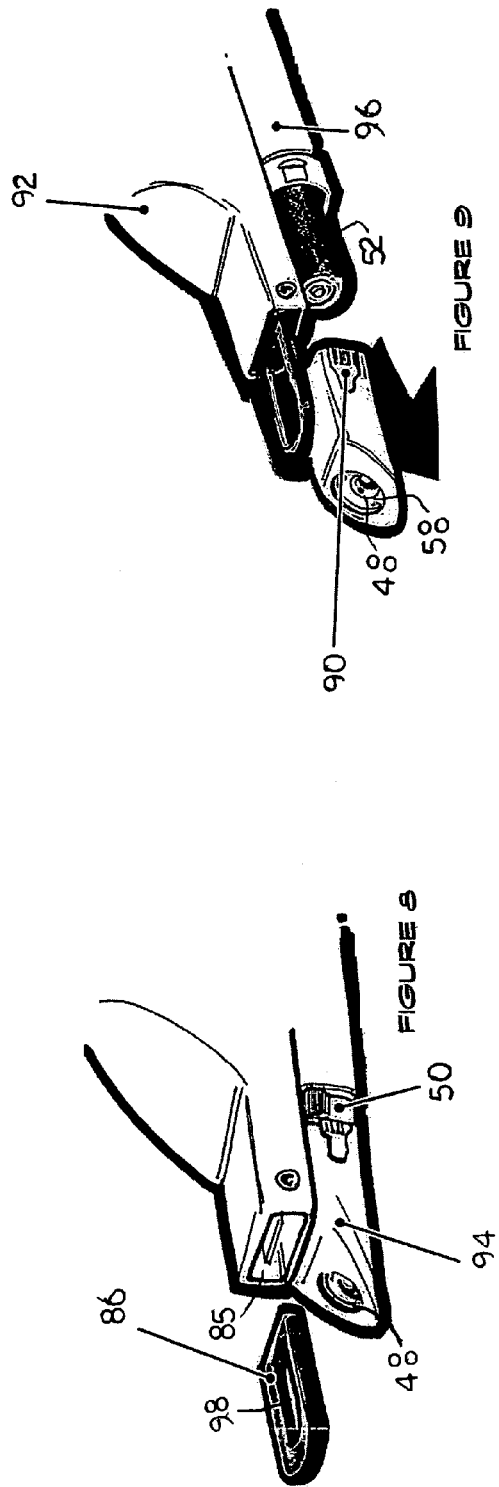

LED NAIL CLIPPER

BACKGROUND

1. Field of the Invention

The present invention relates to a lighting device attachment to a cutter useful as a nail clipper for trimming nails of an animal, such as a dog or cat. More particularly, it relates to a lighting device configured for use in combination with a nail clipper that provides a light source to illuminate the blood vein of the animal's nail providing a visual means for cutting the nail at a length that avoids nicking the blood vein which may result in bleeding and/or injury to the animal.

2. Description of the Related Art

Most animals dislike having their nails clipped. Many dogs object to nail cutting because someone has clipped their nails too short in the past and hurt them. Unlike human toenails, dogs' toenails have a nerve and a blood vein inside them. Often-times the animals squirm and move around making it difficult to clip off the desired amount. When cut too short, it causes pain and bleeding thus injuring the animal.

Therefore, it is desirable to have a tool or tools to easily and safely trim constantly elongating nails on animals that require such trimming without cutting into the blood vein or nerve. The tool of choice in most cases is the conventional nail clipper which conventionally features two opposing blades biased away from each other and which communicate when the bias is overcome by activation of a lever attached thereto. The blade surfaces meet and cut the nail which is first inserted in between the two blades.

Currently, conventionally used nail clippers depend upon the natural vision of the user to see the nail which is intended for cutting, and place it properly in the very small area in between the two opposing cutting blades of the clipper. Placing the nail too far into the blades will cause too much to be removed resulting in injury. Conversely, placing too little of the nail to be cut into the clipper causes too little to be cut away requiring a second and more detailed cut placing the blades closer to the blood vein or nerve creating a greater risk of injury to the animal.

As is obvious, it is imperative for the user to be able to see the nail and surrounding surface clearly, to determine the amount to be cut from the nail and to determine what areas not to cut which would result in injury. It is equally imperative for the clipper user to be able to clearly view the blood vein and nerve within the nail when inserted into the nail clipper to determine that the proper amount is placed into the jaws of the clipper. Currently, the user must depend on his good vision and ability to focus on the nail and work area of the clipper to reach the proper conclusion on cutting.

However, current nail clipping devices only provide a cutting area activated by a lever wherein the user must attempt to see what is being cut unaided. As such, there exists a need for an easily and inexpensively manufactured lighting device that is attachable during manufacture of nail clippers, or with an attachment means allowing the lighting device to be attached to conventionally used and owned nail clippers.

SUMMARY

A lighting device for use in combination with a nail clipper and cutting pliers is disclosed. The lighting device comprises a casing defining an angular front wall having an electric power source, a switch and a light-emitting element all integrally assembled and electrically connected within the casing. A radiation surface is mounted within the angular front wall for transmitting illumination light emitted from the light-emitting element wherein means for removably attaching the casing to either the nail clipper or cutting pliers are provided whereby the angle defined by the front wall positions the illumination light emitted from the light-emitting element to illuminate a blood vein or nerve through the animals nail such that the user does not strike or nick the blood vein or nerve during a cutting operation.

BRIEF DESCRIPTION OF THE DRAWINGS

The drawings are not to scale and are only for purposes of illustration.

FIG. 1 is a perspective view of a conventional nail clipper;

FIG. 2 is a perspective view of a lighting device in accordance with one embodiment of the present invention;

FIG. 3 is a fragmentary perspective view of the conventional nail clipper shown in FIG. 1 showing the mounting of the lighting device shown in FIG. 2;

FIG. 7 is a perspective view of a nail clipper with lighting device in accordance with a third embodiment of the present invention;

FIG. 8 is a fragmentary exploded perspective view of the nail clipper with lighting device shown in FIG. 7 illustrating blade replacement; and FIG. 9 is another fragmentary exploded perspective view of the nail clipper with lighting device shown in FIG. 7 illustrating battery replacement.

DETAILED DESCRIPTION

Figure 4:
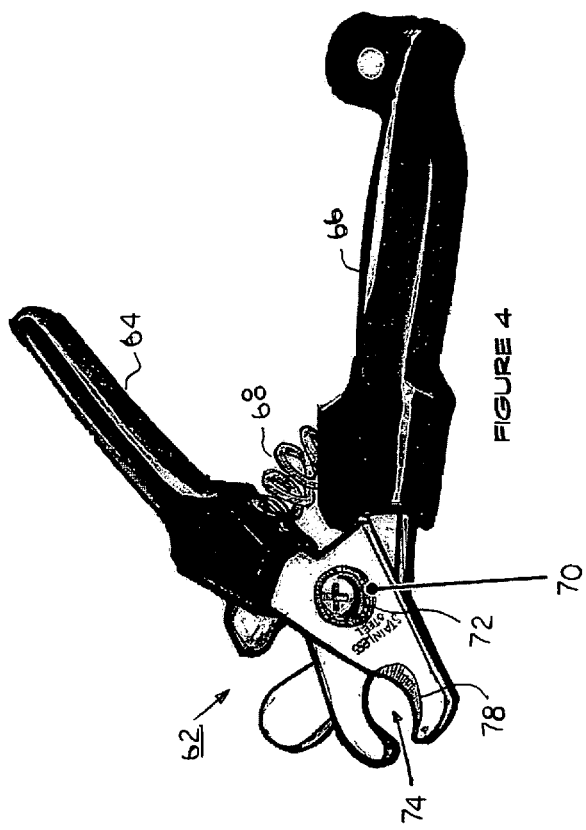
FIG. 4 is a perspective view of another conventional nail clipper.

FIG. 1 provides a perspective view of a conventional nail clipper. The conventional nail clipper 20 includes a stationary handle member 22, a pivoting handle member 24, and a cutting blade 30 connected to be actuated by the pivoting handle member 24. In effect, the cutting blade 30 is similar to that of a guillotine. A cover or top wall 32 secures a nail holder 18 to the lower front portion of stationary handle member 22 by screws 28. As shown in FIG. 1, the forward portion of stationary handle member 22 has top and bottom walls 32 and two opposite side walls 36 which form a generally rectangular passage in which nail holder 18 is stationarily mounted along with a cutting blade 30 which is slidably received in generally overlapped relation with nail holder 18 to slide against the inside surfaces of walls 32 and 36.

Referring now to FIGS. 2 and 3 there are shown perspective views of a lighting device in accordance with one embodiment of the present invention. FIG. 2 shows an example of a structure of a semiconductor lighting device 40 having an electric power source 52, a switch 50 and a light-emitting element 48 such as a light-emitting diode all integrally assembled within a casing 42. A radiation surface 58 transmits the illumination light emitted from the light-emitting element 48 incorporated in the lighting device 58. The radiation surface 58 is formed of a transparent resin material or the like. It is effective to perform surface processing on the radiation surface 58 to obtain directed or focused light. It is also effective to provide a lens. Although FIG. 2 shows the case where the radiation surface 58 is formed on the surface of the casing 42 of the lighting device 58, it is a matter of course that the lighting device may have such a form that the radiation surface 58 projects from the surface of the casing 42. In view of reliability and life, it is practical to use a light emitting diode (LED) as the light-emitting element 48. Although the switch 50 may be of the momentary contact type or of the bistable type, the latter is more convenient in view of its operating property.

Turning once again to FIGS. 2 and 3 the semiconductor lighting device 40 is removably attached to the stationary handle member 22 of the conventional nail clipper 20 by utilizing the same threaded inserts (not shown) provided for screws 28. More specifically, the casing 42 defines an aperture channel 46 sufficiently sized to allow the lower front portion of stationary handle member 22 to slidably engage into when the screws 28 are removed. The aperture channel 46 of the casing 42 defines either two threaded inserts or screw holes 44 through a top wall 60 which are located to align with the threaded inserts used by the screws 28 when the casing 42 is fully inserted onto the lower front portion of stationary handle member 22. Slightly longer screws 29 and washers 56 are then used in lieu of the screws 28 for securely attaching the casing 42 to the lower front portion of the stationary handle member 22, as shown in FIG. 3.

Referring to FIG. 2, the light emitting element 48 is mounted within casing 40 with the radiation surface 58 pointing at an angle defined by a front wall 62 of casing 40. When in use the angle defined by front wall 62 positions the illumination light emitted from the light-emitting element 48 to illuminate the blood vein or nerve through the animals nail (not shown) as will be more fully described below. It should be appreciated that the light-emitting element 48 is chosen of sufficient intensity and frequency to allow the user to visually detect the blood vein and/or nerve when the illumination light directly hits and passes through the nail. In operation, the nail clipper 20 has a generally tear drop shaped aperture 26 there through in the portion thereof protruding outwardly beyond cover 32 to receive and position an animal nail by using the illumination light to position the nail portion to be cut such that it does not strike or nick the blood vein or nerve. The user then engages switch 50 thereby turning on the light emitting element 48. Once the animal nail to be cut is positioned by the user using the light emitting element 48, the blade 30 passes across opening 26 when the clipper is manually actuated by squeezing of handle 24 toward handle 22 against the bias of a tension coil spring 30.

Referring to FIG. 3, the semiconductor lighting device 40 defines a removable back wall 54 of casing 40 for removal and replacement of electric power source 52. By way of example and not of limitation, the electric power source 52 may be a lithium ion button battery. Additionally, it should be understood that the electric power source 52, switch 50 and light-emitting element 48 are all electrically connected to each other as is commonly known in the electrical arts. Lastly, after cutting the animal's nail or nails the user once again engages switch 50 thereby turning off the light emitting element 48 which in turn saves battery power.

FIG. 4 is a perspective view of another conventional nail clipper in the form of cutting pliers. As shown in FIG. 4, the cutting pliers 62 are defined by two levers, 64 and 66 articulated to each other on an axis 72 and kept spread apart by a spring 68, characterized in that one of the levers 64 defines a blade 78 on which the blade is fixed in a movable manner by use of a screw 70 and nut 76 combination.

Figure 5:
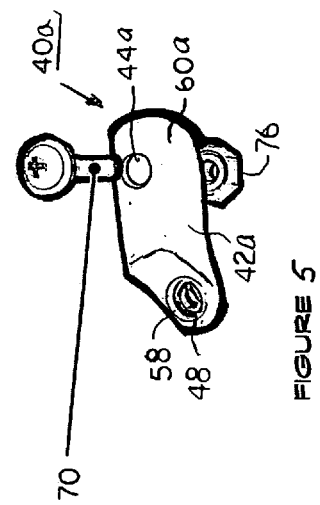
FIG. 5 is an exploded perspective view of a lighting device in accordance with a second embodiment of the present invention.

FIG. 5 shows an exploded perspective view of another lighting device 40a in accordance with a second embodiment of the present invention. The structure of the semiconductor lighting device 40a has the electric power source and switch (not shown), and the light-emitting element 48 all integrally assembled within a slightly different casing 42a from the previously described casing 42. The difference in casing 42a is that it is more elongated and defines a single through-hole 44a along a top wall 60a for receiving the existing screw 70 and nut 76 used with the cutting pliers 63 shown in FIG. 4. It should be understood that all other electrical and optical features of semiconductor lighting device 40a are the same as previously described for semiconductor lighting device 40.

Figure 6:
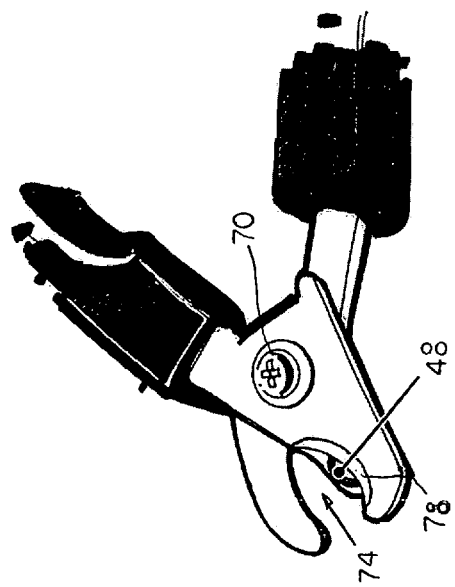
FIG. 6 is a fragmentary perspective view of the lighting device shown in FIG. 5 attached to the conventional nail clipper shown in FIG. 4.

Turning to FIG. 6, the semiconductor lighting device 40a is removably attached to the cutting pliers 62 by utilizing the same hole (not shown) provided for screw 70 and nut 76 using the through-hole 44a defined by casing 42a. Before the screw 70 and nut 76 are tightened, the light emitting element 48 is adjusted to shine through the space 74 defined by the cutting ends of levers 64 and 66. The cutting operation is essentially as described before with the user utilizing the illumination light to detect the blood vein or nerve of the animal thereby locating the blade 78 of the cutting pliers 62 to miss the blood vein and/or nerve when the levers are pulled together to cut the animal's nail.

FIG. 7 is a perspective view of a nail clipper with lighting device in accordance with a third embodiment of the present invention. As shown in FIG. 7 the nail clipper with lighting device 80 includes a stationary handle member 82, a pivoting handle member 84, and a cutting blade 86 connected to be actuated by the pivoting handle member 84. Once again, the cutting blade 84 is similar to that of a guillotine. The lower front portion 88 of stationary handle member 82 houses the switch 50 and light-emitting element 48. The upper front portion 88 of stationary handle member 82 provides a generally rectangular passage 85 in which cutting blade 86 may be slidably received in and out during a cutting operation.

Referring now to FIG. 9 there is shown a perspective view of the lower front portion 88 of nail clipper 80 wherein the electric power source 52, switch 50 and the light-emitting diode 48 are all integrally assembled within the lower front portion 88. The central portion 96 of stationary handle member 82 defines a compartment for housing the battery 50. As described above, the radiation surface 58 transmits the illumination light emitted from the light-emitting element 48 incorporated within the lower front portion 88. Additionally, the blade unit 86 slides out of compartment 85 for easy blade replacement, as shown in FIG. 10. Turning once again to FIG. 9, the lower front portion 88 is removably detached from the stationary handle member 22 by use of press release lever 90 located along the side of the lower front portion 88 for bulb, LED or battery replacement.

Referring to FIG. 10, the light emitting element 48 is mounted with the radiation surface 58 pointing at an angle defined by front wall 94 of lower front portion 88. When in use the angle defined by front wall 94 positions the illumination light emitted from the light-emitting element 48 to illuminate the blood vein or nerve through the animals nail (not shown). Once again, in operation, the nail clipper 80 has a generally tear drop shaped aperture 98 defined within blade 86 to receive and position an animal nail. By using the illumination light to position the nail portion to be cut, the user engages switch 50 thereby turning on the light emitting element 48. Once the animal nail to be cut is positioned by the user using the light emitting element 48, the blade 86 withdraws into rectangular compartment 85 when the clipper is manually actuated by squeezing of handle 84 toward handle 82. The nail is thereafter cut avoiding the nicking or slicing of the blood vein or nerve of the animal.

As is disclosed herein, a lighting device for use in combination with a nail clipper provides the user with the capability to enhance the user's natural ability to see both the nail to be clipped, the location of the blood vein and nerve, and, the working area of the clipper blades which are in the field of view of the user during use of the clipper. By enhancing the view of the blood vein and nerve in the nail as well as the work area of the clipper, the user is provided a major improvement in both safety and utility when using a nail clipper.

The scope of the invention is, therefore, indicated by the appended claims, rather than by the foregoing description. All changes which come within the meaning and range of equivalency of the claims are to be embraced within their scope.

What is claimed is:

1. A lighting device for use in combination with a nail clipper having a stationary handle member in association with a pivoting handle member and a cutting blade connected to be actuated by the pivoting handle member for cutting an animals nail by a user, comprising:
   a casing defining an angular front wall having an electric power source, a switch and a light-emitting element all integrally assembled and electrically connected within said casing;
   a radiation surface mounted within said angular front wall for transmitting illumination light emitted from said light-emitting element; and
   means for removably attaching said casing to the stationary handle member during use of the nail clipper whereby the angle defined by said front wall positions the illumination light emitted from said light-emitting element to illuminate a blood vein or nerve through the animals nail such that the user does not strike or nick the blood vein or nerve during a cutting operation.

2. The lighting device according to claim 1, wherein means for removably attaching said casing to the stationary handle member comprises:
   said casing defining an aperture channel sized to allow the stationary handle member to slidably engage into said aperture channel wherein said aperture channel of said casing defines two screw holes located to align with threaded inserts defined by the stationary handle member for insertion and tightening of one or more screws thereby attaching said casing to the nail clipper.

3. The lighting device according to claim 1, wherein said light-emitting element is a light emitting diode.

4. The lighting device according to claim 3, wherein said light emitting diode having an intensity and frequency to allow the user to visually detect the blood vein and/or nerve when said illumination light directly hits and passes through the nail.

5. The lighting device according to claim 1, wherein said radiation surface is formed of a transparent resin material effective to perform surface processing on said radiation surface to obtain directed or focused light.

6. The lighting device according to claim 1, wherein said casing defines a removable back wall for removal and replacement of said electric power source.

7. The lighting device according to claim 6, wherein said electric power source is a lithium ion button battery.

8. The lighting device according to claim 1 wherein said radiation surface projects from said angular front wall of said casing defining a lens.

9. The lighting device according to claim 1 wherein said switch is a bistable contact type.

10. A lighting device for use in combination with cutting pliers having two levers articulated to each other and kept spread apart by a spring characterized in that one of the levers defines a blade on which the blade is fixed in a movable manner to the other lever by use of a screw and nut combination for cutting an animals nail by a user, comprising:
    a casing defining an angular front wall having an electric power source, a switch and a light-emitting element all integrally assembled and electrically connected within said casing;
    a radiation surface mounted within said angular front wall for transmitting illumination light emitted from said light-emitting element; and
    means for removably attaching and positioning said casing to the cutting pliers using the screw and nut combination whereby the angle defined by said front wall positions the illumination light emitted from said light-emitting element to illuminate a blood vein or nerve through the animals nail such that the user does not strike or nick the blood vein or nerve during a cutting operation.

11. The lighting device according to claim 10, wherein means for removably attaching said casing to the cutting pliers comprises:
    said casing defining a through-hole to allow the screw and nut combination of the cutting pliers to locate and tighten said casing to the cutting pliers.

12. The lighting device according to claim 11, wherein said light-emitting element is a light emitting diode.

13. The lighting device according to claim 12, wherein said light emitting diode having an intensity and frequency to allow the user to visually detect the blood vein and/or nerve when said illumination light directly hits and passes through the nail.

14. The lighting device according to claim 11, wherein said radiation surface is formed of a transparent resin material effective to perform surface processing on said radiation surface to obtain directed or focused light.

15. The lighting device according to claim 11, wherein said casing defines a removable back wall for removal and replacement of said electric power source.

16. The lighting device according to claim 15, wherein said electric power source is a lithium ion button battery.

17. The lighting device according to claim 11 wherein said radiation surface projects from said angular front wall of said casing defining a lens.

18. The lighting device according to claim 11 wherein said switch is a bistable contact type.

19. A nail clipper with lighting device for clipping animal nails by a user, comprising:
    a stationary handle member housing a switch, a light-emitting element and an electric power source in a lower front portion;
    a pivoting handle member connected to said stationary handle member;
    a cutting blade connected to be actuated by said pivoting handle wherein an upper front portion of said stationary handle member provides a generally rectangular passage in which cutting blade may be slidably received in and out during a cutting operation; and a radiation surface mounted within said lower front portion for transmitting illumination light emitted from said light-emitting element wherein said illumination light emitted from said light-emitting element illuminates a blood vein or nerve through the animals nail such that the user does not strike or nick the blood vein or nerve during a cutting operation.

20. The nail clipper with lighting device according to claim 19, further comprising:

said lower front portion being removably detached from said stationary handle member by use of press release lever located along a side of said lower front portion for light emitting element and battery replacement.

\* \* \* \* \*